United States Patent [19]

Tsuruta et al.

[11] 3,827,379
[45] Aug. 6, 1974

[54] ROTARY KILN TYPE SOLID WASTE INCINERATING SYSTEM AND METHOD

[75] Inventors: Hidemasa Tsuruta, Tokyo; Michinori Makiguchi, Chiba-ken, both of Japan

[73] Assignee: Nittetu Chemical Engineering Ltd., Tokyo, Japan

[22] Filed: Mar. 23, 1973

[21] Appl. No.: 344,289

[30] Foreign Application Priority Data
Apr. 24, 1972  Japan............................. 47-028968

[52] U.S. Cl. .................................. 110/14, 432/105
[51] Int. Cl. ............................................. F23g 5/06
[58] Field of Search ................ 110/14, 15; 432/105

[56] References Cited
UNITED STATES PATENTS
581,794   5/1897   Turney............................. 110/14 X
2,213,667   9/1940   Dundas et al........................ 110/14
2,238,161   4/1941   Drew et al............................ 110/14
3,393,651   7/1968   Matteini............................... 110/14
3,547,056   12/1970   Niessen............................... 110/14

Primary Examiner—Kenneth W. Sprague

[57]   ABSTRACT

A rotary kiln type solid waste incinerating system and a method for continuously and efficiently incinerating a large amount of solid waste are disclosed. A vortex is established within the rotating cylinder of the kiln by injection of air to vigorously agitate the atmosphere within the kiln and thereby ensure uniform distribution of oxygen and efficient combustion. In one embodiment, the system includes an air induction duct which is approximately concentric with the rotary cylinder and which has a plurality of air injection nozzles at suitable intervals along its length for injecting air into the rotary cylinder in a direction tangential to its inner surface to establish a vortex.

20 Claims, 3 Drawing Figures

ROTARY KILN TYPE SOLID WASTE INCINERATING SYSTEM AND METHOD

BACKGROUND OF THE INVENTION

This invention relates to a rotary kiln type solid waste incinerating system and to a method for the heavy duty continuous operation thereof.

The amount of combustible solid waste resulting from various operations in industrial plants, factories, and other working and living communities, including household refuge, has become a serious problem which is approaching the unmanageable stage. Therefore, there exists a great need for a solid waste incinerating system capable of continuously incinerating large amount of waste with high efficiency.

Combustible solid waste exists in a variety of shapes and compositions ranging from waste of high calorific value such as rubber, plastics, wood and the like, to waste of a relatively low calorific value such as sludge which contains a large amount of moisture and inorganic materials. Furthermore, different types of waste have different combustion characteristics and behave differently during combustion. For example, waste in the form of ligneous material, such as wood and the like, retains its shape during combustion; however, some types of plastics, pitch, wax and the like possess a certain amount of rigidity and shape at the time of charging but soften and become fluidized upon heating, exhibiting a behavior similar to liquids.

In practice, a solid waste incinerating system of the rotary kiln type is used to dispose of waste materials in the form of sludges, tars, slurries and the like which have no definite shape at the time of charging. Rotary kiln apparatus is generally used for this purpose both when the waste to be disposed of consists solely of fluid or semi-fluids such as sludges, tars, etc. and when such materials are mixed with solid type wastes.

SUMMARY OF THE INVENTION

The present invention provides an apparatus and method for efficiency and continuously incinerating solid waste in a rotary kiln type incinerator having a rotary cylinder which is rotated about an axis disposed at a horizontal angle and which has a charging end and a discharge end with the charging end positioned higher than the discharge end. The steps involved in the method include feeding solid waste continuously to the charging end of the cylinder and injecting air into the cylinder at a high velocity and in a direction tangential to the inner periphery of the cylinder to establish a vortex therein for the purpose of vigorously agitating the atmosphere within the cylinder and uniformly supplying oxygen to the solid waste which is undergoing combustion. The waste is allowed to tumble downward toward the discharge end and the gases are exhausted out of the cylinder in a direction tangential to the inner periphery thereof.

The apparatus of the present invention includes a rotary cylinder having a charging end and a discharge end and which is rotatable about an axis disposed at an angle with respect to the horizontal. The charging end is positioned at a point higher than the discharge end. A charging opening is provided at the charging end of the rotary cylinder and an ash discharge opening and a gas exhaust duct are provided at the discharge end of the rotary cylinder. A stationary exhaust hood is fitted losely over the discharge end of the rotary cylinder and is provided with sealing means for hermetically sealing the circumference of the rotary cylinder without impeding its rotary movement. The ash resulting from combustion of the waste is discharged via an ash discharge opening and through a discharge chute. The air for combustion of the waste materials enters through an induction duct which is located approximately concentrically within the rotary cylinder and which has a plurality of air injection nozzles at suitable intervals along the length thereof for injecting air into the rotary cylinder in a direction tangential to the inner periphery thereby establishing a vortex or swirling air pattern therein. A gas exhaust duct is attached to the rotary cylinder tangentially with respect to the circumference of its surface which design aids in maintaining the vortex established by the air injection nozzles. The air exhaust duct is connected to pressure regulating means for maintaining the pressure within the rotary cylinder at atmospheric or slightly subatmospheric. The discharge end of the rotary cylinder is covered by a stationary end cover which is suitably fitted around the circumference of the discharge end and which is provided with an ash discharge opening.

The advantages accruing from the present invention may be summarized as follows:

1. Combustion air is caused to whirl in a vortex pattern at a high velocity along the inner wall of the cylindrical body so that waste material at the bottom of the furnace is continuously supplied with a sufficient amount of oxygen for combustion and combustion products are continuously removed to uncover new waste surfaces. Furthermore, combustible gases generated as a result of the thermal decomposition of the waste are distributed to every space within the furnace, making the whole space a combustion zone. Experiments indicate that satisfactory results may be obtained with an air injection velocity of about 40 m/sec or higher in cases where the cylindrical body has an inner diameter of about 3 m. Under these conditions the pressure within the air induction duct is about 300 mm water. By the high velocity injection of combustion air, the atmosphere within the furnace may be vigorously agitated without increasing the air ratio.

2. Waste material is incinerated in a hermetically sealed cylindrical body which is lined with a refractory material so that the furnace may be maintained at high temperature with a relatively small thermal loss. Combustion of waste material as a whole is speeded by direct radiation of heat onto the raw waste material and by effective heat transfer to the waste material from heated furnace walls and whirling hot gases, inducing gasification by thermal decomposition. As mentioned under item (1) above, the furnace may be maintained at a high temperature since the atmosphere within the furnace may be fully agitated without using a large amount of air, thus holding the air ratio within a normal range of 1.20 to 1.50. Such an air ratio is extraordinarily low for incinerators of the type described.

3. By slowly rotating the cylindrical body which is held in a slanted position with respect to the horizontal, the charged material is caused to move toward the discharge end of the cylindrical body. Additionally, the waste material within the furnace or cylinder is continuously tumbled by the rotation of the rotary cylinder to ensure uniform heating and combustion. The refractory lining is also heated uniformly by the rotation. Another advantage accruing from the rotation cylinder is that when a waste material melts and adheres to the furnace wall, it is readily burned off when exposed to the upper space clear of the waste heap by the rotation of the cylinder.

4. The vortex movement of gases mentioned under (1) above becomes slower toward the discharge end of the furnace. In order to maintain and promote the movement of the gases, the discharge end of the rotary cylinder is preferably covered by an end cover which is provided with an exhaust gas duct mounted in such a manner as to cause the gases to be exhausted in a direction tangential to the rotary cylinder. In this manner, an annular space is formed within the rotary cylinder and around the air induction duct which allows the air to whirl in a high velocity vortex through and out of the furnace without any interruption of the vortex or whirling pattern of movement.

A large combustion capacity per unit volume of the rotary kiln (Kcal/m³·Hour) is obtained from the combination of the features (1) to (4) described above. For example, when incinerating waste containing plastics or rubbers, it is possible, with the above-described apparatus, to obtain a heat release as high as $1.0 \times 10^6$ Kcal/m³·Hour with an air ratio at about 1.3. A heat release of $1.0 \times 10^6$ Kcal/m³·Hour is about ten times larger than that obtained from an ordinary rotary kiln type incinerator wherein no high velocity vortex is provided within the furnace.

In order to obtain the high heat release rate described above, it is desirable to hold the air ratio as close to the theoretical value as possible and at the same time to agitate vigorously the atmosphere within the furnace. These contradictory requirements are suitably satisfied in the present invention by establishing a vortex within the furnace, utilizing energy of air which is injected into the furnace at a high velocity.

The most efficient combustion may be obtained by continuously feeding a large amount of waste material into the furnace and discharging ashes and incombustible residues from the furnace while maintaining a continuous tumbling movement of the waste material toward the discharge end of the furnace, and by preventing the furnace temperature and other operating parameters within the furnace from being disturbed by the feeding and discharging operations. According to the present invention, the movement of charged material toward the discharge end is determined by the speed of revolution and by the mounting angle of the rotary cylinder. By connecting the suction side of an exhaust gas blower to the gas exhaust duct, the pressure within the furnace in the vicinity of the charge opening is maintained at or slightly lower than atmospheric. This ensures complete conduction of spent gases out through the exhaust gas duct and minimizes the amount of air leaking into the furnace through the waste charge and discharge openings. By holding such in-leakage to a minimum, a material increase in the air ratio and a material drop in the combustion temperature are prevented.

Accordingly, it is an object of the present invention to provide a rotary kiln type solid waste incinerator and a method for efficiently and continuously incinerating a large amount of solid waste.

Another object of the present invention is to provide a rotary kiln type solid waste incinerator and a method for efficiently and continuously incinerating a large amount of solid waste, wherein a vortex is established by air injected into the rotary cylinder to provide uniform oxygen distribution and to ensure efficient combustion without increasing the amount or ratio of air injected.

A yet further object of the present invention is to provide a rotary kiln type solid waste incinerator and a method for efficiently and continuously incinerating a large amount of solid waste, wherein the combustion of waste material may be carried out at high temperature with a minimum of heat loss.

The above and other objects, features and advantages of the present invention will become more apparent from the following description, when considered along with the accompanying drawing which shows, for purposes of illustration, a preferred embodiment of the present invention.

DESCRIPTION OF THE PREFERRED EMBODIMENTS

Figure 1:
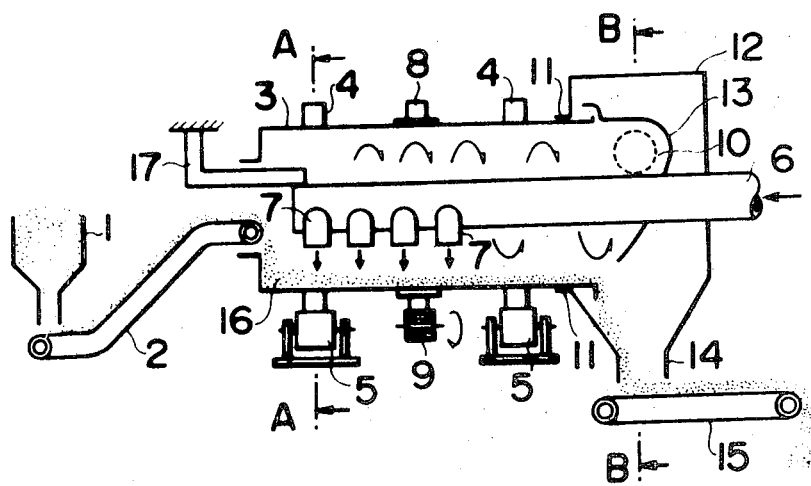
FIG. 1 is a vertical longitudinal view, partially in cross-section, diagramatically showing the rotary kiln apparatus of the present invention.
Figure 2:
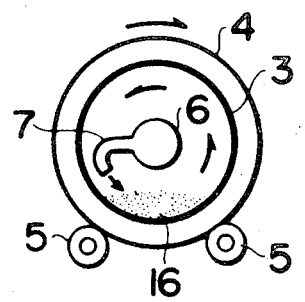
FIG. 2 is a vertical transverse view, partially in cross-section, taken substantially along line A—A of FIG. 1.
Figure 3:
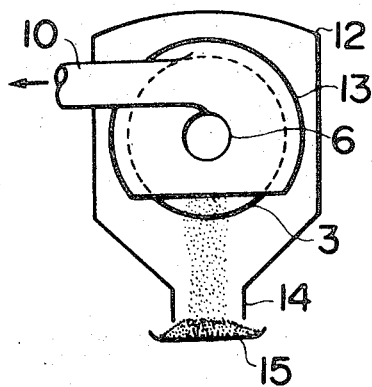
FIG. 3 is a vertical transverse view, partially in cross-section, taken substantially along line B—B of FIG. 1.

Referring to FIGS. 1 through 3, the rotary kiln type solid waste incinerating system of the present invention is shown as including a hopper 1 which receives the raw waste material for incineration. The waste material 16 is emptied from the hopper 1 onto a feed conveyer 2 which is located beneath the hopper 1 and which continuously transfers the unprocessed waste, at a predetermined speed, to the charging end of a drum or cylindrical body 3 which forms a main part of the combustion furnace or kiln of the system. Where the waste material to be burned is in the form of large blocks or the like, it may be pulverized or broken into smaller pieces beforehand to facilitate the charging of the furnace. If the waste material is in the form of sludge, paste, slurry or the like, the waste material may be transferred through a feed duct connected directly to the furnace by means of a high viscosity pump. The design of the kiln charging means should be selected in accordance with the nature of the waste material to be burned.

The inner wall of the cylindrical body 3 is lined with a refractory material. Fitted securely around the circumference of the cylindrical body 3 are at least two spaced rings 4 each mounted on a pair of rollers 5. In the embodiment shown, the rotary cylindrical body 3 is mounted on two pairs of rollers 5 at a predetermined angle with respect to the horizontal to place the charging end of the cylindrical body at a higher level than the discharge end. The cylindrical body has further mounted thereon a girth gear 8 which is meshed with a pinion 9. This pinion 9 is connected to the drive shaft of a motor through a suitable reducer (not shown) for imparting rotary movement to the cylindrical body 3, normally at a speed range of 0.5 to 3 rpm. The speed of rotation and the angular disposition of the cylindrical body determine the velocity of displacement and residence time of the waste material within the furnace.

An air induction duct 6 extends approximately concentrically through the rotary cylindrical body 3 and through a hood 12 which is loosely fitted over the discharge end of the cylindrical body 3. The air induction 6 terminates in the vicinity of the waste charge opening of the cylindrical body 3 and is supported by an air induction duct support 17. The air induction duct 6 is provided at suitable intervals along its length with a plurality of air injection nozzles 7. The air injection nozzles 7 are integral with the air induction duct 6. The ejection ends of these nozzles 7 open near the inner surface or wall of the rotary cylindrical body 3 in such a manner as to eject air tangentially with respect to the inner wall of the cylindrical body.

The discharge end of the rotary cylindrical body 3 is fitted with a hood 12 which is provided with sealing means 11 around the circumference of the cylindrical body 3 in order to maintain a hermetic seal around the cylinder 3 even while the cylinder is rotating. The cross-sectional area of the discharge end of the cylindrical body which is fitted into the hood 12 is partially covered by an end cover 13 which is mounted in a fixed position and spatially fitted around the circumference of the discharge end of the cylindrical body as shown in FIG. 3. The lower portion of the end cover 13 is terminated short of the bottom of the cylindrical body 3 to provide an opening for passing ashes and noncombustible residues therethrough. The ashes and noncombustible residues that pass through the discharge opening are discharged through an ash discharge chute 14 located at the bottom of the hood 12 and are then transferred out of the system by a belt conveyer 15 as shown in FIG. 1.

The above-mentioned end cover 13 is mounted in a fixed position and slightly spaced from the circumference of the cylindrical body 3. The end cover 13 has a central opening to allow for passage of the air induction duct 6 and a second opening leading to gas exhaust duct 10 which is integral with the end cover 13 and which opens in a direction tangential thereto for discharging exhaust gases without disturbing the vortex pattern established within the furnace. It is generally accepted practice to connect the exhaust gas duct 10 to a cyclone (not shown) to remove solid dust particles from the exhaust gases. The exhaust gas may be routed through a waste heat boiler (not shown) to conserve heat before releasing the exhaust gases into the atmosphere.

In operating the incinerating system of the present invention, a suitable amount of waste material is charged into the rotary cylindrical body 3 and combustion is initiated by suitable means such as a pilot burner (not shown). Thereafter, the feed conveyer 2, rotary cylindrical body and discharge conveyer 15 are started, as well as the air blower for the air induction duct 6 and the exhaust blower for the exhaust gas. These blowers are preferably located in a relatively cool place remote from the furnace. The exhaust blower is conveniently located between the furnace and a waste-heat boiler or chimney.

In the embodiment shown, the air induction duct 6 is passed through the hood 12 at the discharge end of the cylindrical body and axially extended toward the waste charging port of the cylindrical body. However, it will be appreciated that the air induction duct may be passed into the cylindrical body from the opposite end, i.e., axially through the charging inlet toward the discharge end of the furnace.

The invention may be embodied in other specific forms without departing from the spirit or essential characteristics thereof. The embodiment described above is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In a rotary kiln incinerator having a cylindrical body rotatable about an axis disposed at an angle with respect to the horizontal, said cylindrical body having a waste charge end provided with an opening for receiving waste to be incinerated and a discharge end provided with an outlet opening for the discharge of ash and other incombustible residues, and gas exhaust means, the improvement which comprises:
   an air induction duct located approximately concentrically within said rotary cylinder and having a plurality of air injection nozzles at suitable intervals along the length thereof for injecting air into said rotary cylinder in a direction tangential to the inner periphery thereof to establish a vortex therein.

2. The rotary kiln incinerator of claim 1 further comprising a hopper for collecting waste material and transfer means for transferring the waste material from said hopper to said charge end of said rotary cylinder.

3. The rotary kiln incinerator of claim 2, wherein said transfer means is a belt conveyer.

4. The rotary kiln incinerator of claim 1 further comprising at least two spaced rings each securely fitted around the circumference of said rotary cylinder and mounted on a pair of rollers.

5. The rotary kiln incinerator of claim 1, further comprising a girth gear provided around the circumference of said rotary cylinder and a motor-driven pinion meshed with said girth gear.

6. The rotary kiln incinerator of claim 1 further comprising a discharge conveyer for transferring ashes and noncombustible residues away from said ash discharge outlet to a point remote from the incinerator.

7. The rotary incinerator of claim 1 further comprising an exhaust hood fitted over said discharge end of said rotary cylinder and sealing means for hermetically sealing said exhaust hood around the circumference of said rotary cylinder without impeding the rotary movement thereof.

8. In a rotary kiln type solid waste incinerating system having a rotary cylinder with a charging end and a discharge end and rotatable about an axis disposed at an angle with respect to the horizontal; a charging opening provided at said discharge end of said rotary cylinder; an ash discharge opening provided at said discharge end of said rotary cylinder; and gas exhaust means; the improvement which comprises:
   an air induction duct approximately concentrically located within said rotary cylinder and having a plurality of air injection nozzles located at suitable intervals along the length thereof for injecting air into said rotary cylinder in a direction tangential to the inner periphery of said cylinder to induce a vortex therein; and said gas exhaust means being a duct opening into said rotary cylinder in a direction tangential to the said inner periphery for maintaining the vortex induced with said rotary cylinder.

9. The rotary kiln type solid waste incinerating system of claim 8 further comprising a hopper for collecting waste material and transfer means for transferring the waste material from said hopper to said charge end of said rotary cylinder.

10. The rotary kiln type solid waste incinerating system of claim 8 wherein said transfer means is a belt conveyer.

11. The rotary kiln type solid waste incinerating system of claim 8 further comprising at least two spaced rings each securely fitted around the circumference of said rotary cylinder and mounted on a pair of rollers.

12. The rotary kiln type solid waste incinerating system of claim 8 further comprising a girth dear provided around the circumference of said rotary cylinder and a motor-driven pinion meshed with said girth gear.

13. The rotary kiln type solid waste incinerating system of claim 8 further comprising a discharge conveyer for transferring ashes and noncombustible residues from said ash discharge outlet to a predetermined point remote from the system.

14. The rotary kiln type solid waste incinerating system of claim 8 further comprising an exhaust hood fitted over said discharge end of said rotary cylinder and sealing means for hermetically sealing said exhaust hood around the circumference of said rotary cylinder without impeding the rotary movement thereof.

15. The rotary kiln type solid waste incinerating system of claim 8 further comprising an end cover supported in a fixed position and spatially fitted over said discharge end of said cylindrical body to cover most of the cross-sectional area thereof except for said ash discharge opening.

16. A method for continuously incinerating waste in a rotary kiln type incinerator wherein the kiln has a rotary cylinder which is rotatable about an axis disposed at an angle with respect to the horizontal, said rotary cylinder having a charging end and a discharge end, said charging end being located at a higher level than said discharge end, and an air induction duct located approximately concentrically within said rotary cylinder, said air induction duct having a plurality of air injection nozzles arranged at suitable intervals along the length thereof, said method comprising:

feeding solid waste continuously to the charging end of the rotary cylinder;

injecting air through said air injection nozzles into the rotary cylinder at a velocity and in a direction tangential to the inner periphery of said cylinder to establish a vortex therein for vigorously agitating the atmosphere within the cylinder and uniformly supplying oxygen to the waste underging combustion;

causing said waste to tumble from said charging end toward said discharge end; and removing the ashes and noncombustible residues from said discharge end.

17. The method of claim 16 further comprising the step of conducting the exhaust gases out of said rotary cylinder at said discharge end, in a direction tangential to the inner periphery of said rotary cylinder.

18. The method of claim 16 wherein air is injected into said rotary cylinder at an air ratio within the range of from about 1.2 to about 1.5.

19. The apparatus of claim 1 wherein said plurality of nozzles are arranged in comb-like fashion.

20. The system of claim 8 wherein said air injection nozzles are located along the length of said air induction duct in a comb-like fashion.

* * * * *